(12) United States Patent
Aoki (10) Patent No.: US 6,304,529 B2
(45) Date of Patent: Oct. 16, 2001

(54) REPRODUCTION APPARATUS AND METHOD

(75) Inventor: Nobuyuki Aoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/741,263

(22) Filed: Dec. 19, 2000

Related U.S. Application Data (62) Division of application No. 08/957,951, filed on Oct. 27, 1997, now Pat. No. 6,226,240.

(30) Foreign Application Priority Data

Oct. 29, 1996 (JP) .................................................. 8-286385

(51) Int. Cl.$^7$ .................................................. G11B 7/00
(52) U.S. Cl. .................................. 369/44.28; 369/32
(58) Field of Search .................... 369/32, 33, 44.25, 369/44.27, 44.28, 47.38, 47.39, 47.4, 47.47, 47.55, 53.29, 53.3, 53.37, 53.39, 124.02

(56) References Cited

U.S. PATENT DOCUMENTS

| | | | |
|---|---|---|---|
| 5,500,840 | 3/1996 | Ogasawara | 369/32 |
| 5,511,051 | 4/1996 | Rokutan et al. | 369/44.28 |

FOREIGN PATENT DOCUMENTS

| | | |
|---|---|---|
| 0 463 820 A2 | 1/1992 | (EP) . |
| 0 572 042 A2 | 12/1993 | (EP) . |

OTHER PUBLICATIONS

Patent Abstracts of Japan, vol. 016, No. 100 (P–1323), Mar. 11, 1992 & JP 03 276425 A (Masushita Electric Ind Co Ltd), Dec. 6, 1991.

Primary Examiner—Paul W. Huber
(74) Attorney, Agent, or Firm—Frommer Lawrence & Haug LLP; William S. Frommer; Gordon Kessler

(57) ABSTRACT

A reproducing apparatus and method are provided in accordance with the invention. The apparatus includes a reader for reading out data from a recording medium, a controller for controlling the position of the reader, and a determiner for determining a number of tracks the controller is to move the reader. The apparatus also includes a comparator, which compares whether the determined number of tracks is less than a predetermined number of tracks in which each of the tracks has an essentially equal number of sectors therein. If so, the controller moves the position of the reader in accordance with the equation $$T_j = |S_t - S_c| / S_n$$

wherein $T_j$ is the number of tracks said reading means is to move, $S_t$ is the address of the target sector to be read out next, $S_c$ is the address of the current sector, and $S_n$ is the essentially equal number of sectors in a track. A method utilizing the apparatus is also provided.

12 Claims, 6 Drawing Sheets

REPRODUCTION APPARATUS AND METHOD

CROSS REFERENCED TO RELATED APPLICATIONS

This application is a divisional application of application Ser. No. 08/957,951, filed Oct. 27, 1997, now U.S. Pat. No. 6,226,240.

BACKGROUND OF THE INVENTION

This invention relates generally to a reproduction apparatus and method, and more particularly to a reproduction apparatus and method wherein a reading out position of a reading out element for reading out data from a predetermined sector of a predetermined track of a recording medium is moved to read out data from the recording medium.

At present, optical discs, such as compact discs, on which digital data are recorded are widely used. On such optical discs, data are recorded on each of a plurality of sectors of a plurality of tracks formed in circumferential directions on the discs. Each of the plurality of sectors is also provided with a sector address.

When reproducing data recorded on an optical disc making use of an optical pickup, laser light is irradiated upon pits formed on tracks of the optical disc which are positioned to correspond to the stored data being transmitted. Light which is reflected from the pits on the disc is photo-electrically converted, so as to read out the stored data from each sector.

The optical pickup is adapted to move in a radial direction of the optical disc, and thus in a direction perpendicular to a tangent of each circular track of the optical disc, for example, by a drive motor. Accordingly, when data are to be read out continuously from sectors positioned on different tracks, a control circuit for controlling the drive motor calculates the number of tracks the optical pickup must be moved to arrive at the track having the sector to be read out next. This calculation is made from a sector address which represents the current position of the optical pickup and another sector address of a sector to be read out next. The optical pickup is then moved by the required number of tracks.

Figure 6:
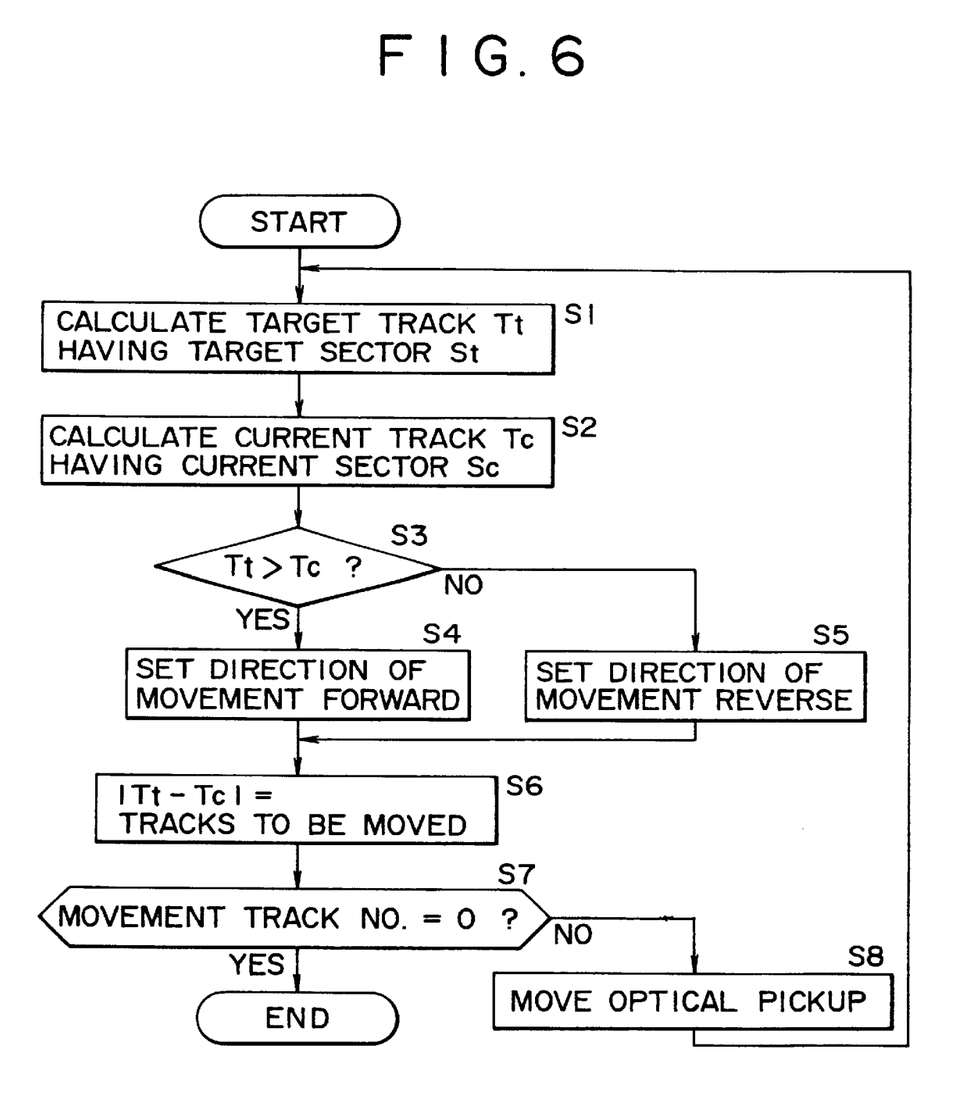
FIG. 6 is a flow chart illustrating a conventional scheme for movement of an optical pickup.

Next, an example of the calculation of the distance over which the optical pickup is to be moved is described with reference to the flow chart depicted in FIG. 6.

First in step S1, a track number $T_t$ of a target track, which contains a target sector $S_t$ is calculated from the address of the target sector. In a preferred embodiment, the number $T_t$ of the target track is calculated in the following manner.

First, the distance along the radius of the disc to the target $T_t$ track which has the target sector address is represented by r. The distance along the radius of the disc from the current track to a reference track which has a reference sector Sr (start point of a program area) is represented by $r_0$. The track pitch is represented by $T_p$, the rotational speed (linear velocity) of the optical disc is represented by V1, and the sector frequency is represented by fs. The sector number $S_n$ (number of sectors) of a track located at a radius r is represented by an expression (1).

$$S_n = 2\pi r \times fs / V1 \tag{1}$$

In a preferred embodiment, by way of example, in which the optical disc is a DVD (Digital Versatile Disc), $r_0$ is fixed at 24.00 mm and $T_p$ is fixed at 0.74 μm while V1 is fixed at 3.49 m/s for a single layer disc but fixed at 3.84 m/s for a dual layer disc.

Furthermore, where the number of tracks from the track having the reference sector address $S_r$ to the track which has the target sector address $S_t$ is represented by k, the radius r from the current track to the track having the target sector address $S_t$ is represented by an expression (2).

$$r = r_0 + k \times T_p \tag{2}$$

Accordingly, the total number S of sectors which are contained between the track having the reference sector address $S_r$ and the Nth track is represented by an expression (3).

$$S = \sum_{K=0}^{N-1} S_n \tag{3}$$

$$= \sum_{K=0}^{N-1} \frac{2\pi fs(r_o + kT_p)}{V1}$$

$$= \frac{2\pi fs}{V1}\left\{Nr_o + \frac{N(N-1)T_p}{2}\right\}$$

The expression (3) is a quadratic equation regarding N and may be re-written into an expression (4).

$$\pi \times fs \times T_p \times N^2 + \pi \times fs \times (2r_0 - T_p) \times N - V1 \times S = 0 \tag{4}$$

Then, solving this equation (expression (4)) for N (track number), N is represented by an expression (5).

$$N = \frac{-\pi fs(2r_o - T_p) + \sqrt{\{\pi fs(2r_o - T_p)\}^2 + 4\pi fs T_p V1 S}}{2\pi fs T_p} \tag{5}$$

$$= \frac{2r_o - T_p}{2T_p} + \sqrt{\frac{2r_o - T_p}{2T_p} + \frac{V1S}{\pi fs T_p}}$$

Here, since the radius ro to the track having the reference sector is much larger than the track pitch $T_p$ ($r_0 >> T_p$), N may be represented approximately by an expression (6).

$$N = -\frac{r_o}{T_p} + \sqrt{\left(\frac{r_o}{T_p}\right) + \frac{V1S}{\pi fs T_p}} \tag{6}$$

Accordingly, since the track number $T_t$ of the target track is equal to the number of tracks the target track is positioned from the reference track, the track number $T_t$ may be calculated from the sector address $S_t$ in accordance with an expression (7).

$$T_t = -\frac{r_o}{T_p} + \sqrt{\left(\frac{r_o}{T_p}\right)^2 + \frac{V1S_t}{\pi fs T_p}} \tag{7}$$

Thus, the track number $T_t$ of the track containing the next sector to be read may be calculated in this manner. It is to be noted that, from the number $T_t$ of the track, the sector number $S_n$ on the track is calculated in accordance with an expression (8).

$$S_n = \frac{2\pi fs\{r_o + (T_t - 1)T_p\}}{V1} \tag{8}$$

Then, in step S2, from the current sector address $S_c$ of the current sector, the number $T_c$ of the current track on which the current sector $S_c$ is located is calculated in accordance with an expression (9).

$$T_c = -\frac{r_o}{T_p} + \sqrt{\left(\frac{r_o}{T_p}\right)^2 + \frac{VlSc}{\pi f s T_p}} \quad (9)$$

Then, in step S3, it is determined whether or not the number $T_t$ of the target track in which is located the target sector $S_t$ to be read out next is larger than the number $T_c$ of the current track on which the current sector $S_c$ is located. If it is determined that the number $T_t$ of the target track is larger than the number $T_c$ of the current track, then the direction of movement of the optical pickup is set to the forward direction toward the outermost circumference of the optical disc in step S4.

On the other hand, if it is determined in step S3 that the number $T_t$ of the target track on which the target sector $S_t$ is located is equal to or smaller than the number $T_c$ of the current track on which the current sector $S_c$ is located, then the direction of movement of the optical pickup is set to the reverse direction toward the innermost circumference of the optical disc in step S5.

In step S6, an absolute value $|T_t-T_c|$ of the difference between the number $T_t$ of the target track on which the target sector $S_t$ to be read next is located and the number $T_c$ of the current track on which the current sector $S_c$ is located determines the number of tracks the optical pickup is to move.

In step S7, it is determined whether or not the movement track number is 0. If it is determined that the movement track number is 0, then movement of the reading out position is stopped. If the movement track number is not 0, then in step S8 the optical pickup is moved the appropriate number of tracks, as determined in step S6. Thereafter, the control returns to step S1 so that it can be confirmed that the target track has been reached. If it is determined that the current track $T_c$ is equal to the target track $T_t$, then no further movement is performed. However, if $T_c$ is not equal to $T_t$, movement of the optical pickup is performed repetitively (track jumping) until $T_c$ equals $T_t$.

In this manner, because when the optical pickup is moved an error may occur, track jumping is performed repetitively until the optical pickup reaches the target track $T_t$.

However, the method described above is deficient. Since the number $T_c$ of the current track at the current position of the optical pickup and the number $T_t$ of the target track of the destination of the optical pickup, and therefore the required movement of the optical pickup, are calculated for each required track jump and movement of the optical pickup in accordance with expression (7) or expression (9), each of which is a complicated expression including a square root, the calculation of the movement track number takes a long time. Thus, it is difficult to move the optical pickup to the proper position of the target track at a high speed.

OBJECTS OF THE INVENTION

Accordingly, it is an object of the invention to provide an improved method and apparatus for moving an optical pickup from a current track to a target track.

Another object of the invention is to provide an improved method and apparatus for moving an optical pickup from a current track to a target track quickly.

A further object of the invention is to provide an improved method and apparatus for moving an optical pickup from a current track to a target track quickly by utilizing different formulae to calculate the required amount of movement based upon the amount of movement required.

Yet another object of the invention is to provide an improved method and apparatus for moving an optical pickup from a current track to a target track which utilizes a simple expression to determine the amount of movement of the optical pickup when the amount of movement required is relatively small.

A still further object of the invention is to provide an improved method and apparatus for moving an optical pickup from a current track to a target track which selects a particular formula to determine the amount of movement of the optical pickup in accordance with the distance the optical pickup is to be moved.

Still other objects and advantages of the invention will in part be obvious and will in part be apparent from the specification and the drawings.

SUMMARY OF THE INVENTION

Generally speaking, in accordance with the invention, a reproduction apparatus for reproducing data stored on a recording medium is provided. The reproduction apparatus includes control means which calculates the number of tracks over which an optical pickup must be moved when moving from a current sector to a target sector to be read next making use of one of a plurality of calculation expressions depending upon the distance from the current sector (and track) to the target sector (and track).

A reproduction method is also provided in which the number of tracks over which the position of the optical pickup is to be moved when moving from a current track to a target track to be read next is calculated making use of one of a plurality of calculation expressions depending upon the distance to the target track containing the target sector to be read out next from the current track.

The invention also comprises a reproduction apparatus, including control means. When the position of the optical pickup is to be changed form a current track to a target track containing a target sector to be read out next, the control means calculates if the number of tracks which the optical pickup must be moved leaves the optical pickup within a range of tracks in which the number of sectors per track at the target track is at least approximately equal to the number of sectors per track at the current track. If so, the number of tracks $T_t$ over which the optical pickup must be moved is calculated in accordance with a simple expression ($T_j=|S_t-S_c|/S_n$), in which the address of the target sector to be read out next is represented by $S_t$, the current sector address is represented by $S_c$, and the number of sectors per track at the current and target track is represented by $S_n$.

The invention further comprises a reproduction method in which the position of an optical pickup is to be changed from a current track to a target track including a target sector to be read out next. If the number of tracks over which the optical pickup is to be moved leaves the optical pickup within a range of tracks in which the number of sectors per track at the target track is at least approximately equal to the number of sectors per track at the current track, the number $T_j$ of tracks over which the optical pickup must be moved is calculated in accordance with a calculation expression ($T_j=|S_t-S_c|/S_n$), where the address of the target sector to be read out next is represented by $S_t$, the address of the current sector is represented by $S_c$, and the number of sectors per track at the current and target track is represented by $S_n$.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
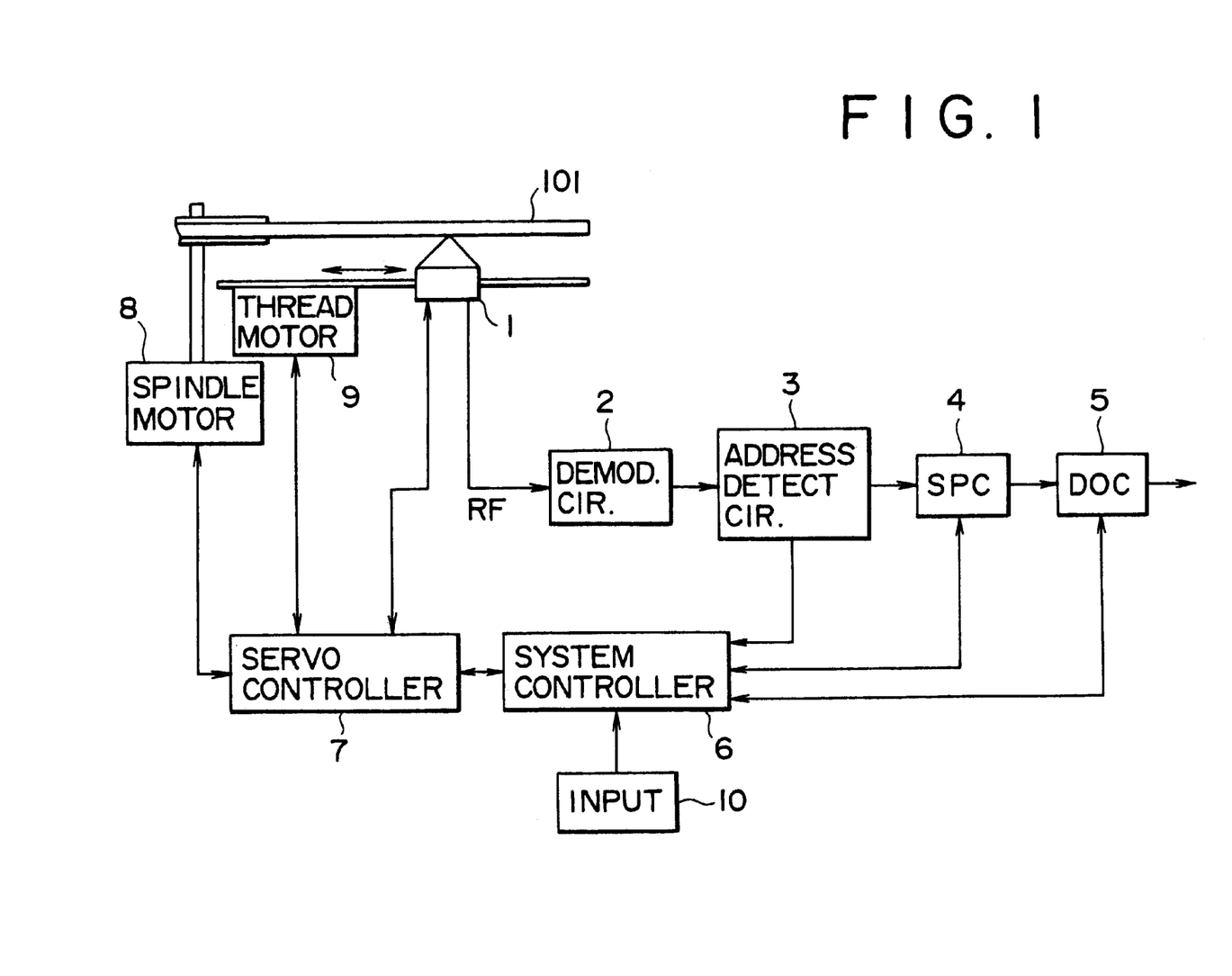
FIG. 1 is a block diagram depicting a reproduction apparatus constructed in accordance with a first embodiment of the invention.

Reference is first made to FIG. 1, which depicts a reproduction apparatus constructed in accordance with a first embodiment of the invention. An optical pickup 1 (reading out means) irradiates laser light upon an optical disc 101. Optical disc 101 is adapted to selectively reflect this laser light in accordance with the data stored thereon. Optical pickup 1 then photo-electrically converts the reflected light from optical disc 101 and outputs an RF signal in accordance with a signal obtained from a demodulation circuit 2 which interprets the pattern of the selectively reflected light. Additionally, optical pickup 1 adjusts the distance of an objective lens (not shown) built therein from the optical disc 101 in accordance with a control signal supplied thereto from a servo controller 7.

Demodulation circuit 2 digitizes the RF signal supplied thereto from the optical pickup 1 in a binary fashion, performs error correction on the binary digitated data, and then outputs the reproduced digital data to a sector address detection circuit 3.

Sector address detection circuit 3 extracts, from the digital data supplied thereto, an address of the current sector on which the digital data are recorded. Thus, an address $S_c$ of the current sector from which the data is being read is contained within the data. After being extracted by sector address detection circuit 3, the current sector address is output to a system controller 6 (control means). Further, the sector address detection circuit 3 outputs the digital data supplied thereto to a signal processing circuit (SPC) 4.

Signal processing circuit 4 performs predetermined processing (for example, decompression of compressed data and so forth) for the digital data supplied thereto and outputs the data after the processing to a data outputting circuit (DOC) 5. Further, for example, where multiplexed data are recorded on the optical disc 101, signal processing circuit 4 selects one of the multiplexed data in response to a predetermined setting and outputs an address (sector address) of selected data to the system controller 6.

Data outputting circuit 5 is controlled by the system controller 6 and outputs the data supplied thereto from signal processing circuit 4 to a predetermined receiving circuit (not shown). System controller 6 causes servo controller 7 to control drive systems (a spindle motor 8, a head drive motor 9 and so forth) in response to the sector address $S_c$ supplied thereto from sector address detection circuit 3 and a signal supplied thereto from an inputting element 10 and corresponding to a setting supplied by a user.

Servo controller 7 controls spindle motor 8 to rotate optical disc 101 so that the linear velocity at the position of optical pickup 1 where the data is being read out equals a predetermined velocity, and controls motor 9 so that optical pickup 1 may be disposed at proper location to read out data, as instructed by system controller 6.

The operation of the reproduction apparatus of FIG. 1 when the position of optical pickup 1 is to be moved will now be described making reference to the flow chart of FIG. 2.

First in step S21, in response to a signal from signal processing circuit 4 or inputting element 10, a sector address $S_t$ of a target sector from which data is to be read out next is provided to system controller 6. A number $T_t$ of a target track having the target sector $S_t$ is calculated in accordance with expression (7) (noted above). Also, the number of sectors $S_n$ in the target track $T_t$ is calculated in accordance with expression (8) (noted above).

Next in step S22, system controller 6 receives a sector address $S_c$ of the current sector being read from sector address detection circuit 3 and calculates a number $T_c$ of the current track having this current sector $S_c$ sector in accordance with expression (9) (noted above).

Then, in step S23, system controller 6 determines whether or not the number $T_t$ of the target track containing the target sector $S_t$ (the next sector to be read) is larger than the number $T_c$ of the current track containing the current sector $S_c$. If system controller 6 determines that the number $T_t$ is larger than the number $T_c$, then in step S24 the direction of movement of optical pickup 1 is set to the forward direction toward an outermost circumference of optical disc 101.

On the other hand, if system controller 6 determines in step S23 that the number $T_t$ of the target track containing the target sector $S_t$ is equal to or smaller than the number $T_c$ of the current track containing the current sector $S_c$ then in step S25 the direction of movement of optical pickup 1 is set to the reverse direction toward an innermost circumference of the optical disc 101.

In step S26, system controller 6 sets a movement track value equal to an absolute value $|T_t - T_c|$ between the number $T_t$ of the target track having the target sector $S_t$ (the sector to be read out next) and the number $T_c$ of the current track having the current sector $S_c$.

In step S27, system controller 6 determines whether or not the movement track number is 0. If system controller 6 determines that the movement track number is 0, then it ends the movement of optical pickup 1, since optical pickup would be positioned within the proper track to read the next target sector $S_t$. However, if system controller 6 determines that the movement track number is not 0, then in step S28 system controller 6 instructs servo controller 7 to drive motor 9 so that optical pickup 1 is moved by a distance equal to the movement track number set in step S26 or step S30 (hereinafter described). System controller 6 then advances to step S29.

In step S29, system controller 6 determines whether or not the movement track number is smaller than 1,000. If the movement track number is equal to or larger than 1,000, then system controller 6 returns control to step S22 to effect processing in steps S22 to S26 to calculate the movement track number making use of the expression (9).

On the other hand, if system controller 6 determines in step S29 that the movement track number is smaller than 1,000, then position of optical pickup 1 on the current track $T_c$ is in the proximity of the target track $T_t$. System controller 6 then calculates the movement track number making use of an expression (10) (described below) which is simpler than expression (9) (described above). Here $T_j$ represents the movement track number.

$$T_j = |T_t - T_c|/S_n \quad (10)$$

By making use of the expression (10) in this manner, the movement track number can be calculated simply by using an expression performing only arithmetical operations and utilizing only the current sector address $T_c$, the address $T_t$ of the target track containing the target sector $S_t$ and the sector number $S_n$, representing the number of sectors per track at both the current and target tracks (which is approximately the same when $T_j$ is less than 1000). While the number of sectors per track of a DVD is approximately equal for less than 1,000 tracks, it is possible to choose the comparison number in step S29 to be any value less than 1,000. In a preferred embodiment, this number may be 64. Further, since only the relationship between two points is utilized in place of a calculation which determines an absolute position from a reference track, the calculation error in movement track number is reduced.

After this calculation, control is returned to step S27. In step S27, system controller 6 determines again whether or not the movement track number is 0. If system controller 6 determines that the movement track number is 0, then movement of optical pickup 1 ends. However, if system controller 6 determines that the movement track number is not 0, then in step S28, optical pickup 1 is moved by a distance equal to the movement track number set in step S30. System controller 6 then advances to step S29.

In such a manner, system controller 6 first performs the processing in steps S21 to S26 to calculate the movement track number. If it is determined that the movement track number is smaller than 1,000, then system controller 6 only performs the processing in step S30 (making use of the simpler expression) to calculate the movement track number. By this operation, the time required for the movement of optical pickup to the proper position at the target track $T_t$ can be reduced.

Now making reference to FIG. 3, the details of the processing in step S30 of FIG. 2 will be described.

In step S41, system controller 6 calculates the movement track number $T_j$ in accordance with expression (10) assuming that the number of sectors in the current track are equal. This is a possible approximation, since in a preferred embodiment where the optical disc 101 is a DVD, when the movement track number is smaller than 1,000, the number of sectors per track are substantially equal. Even if they are not equal, since the position of optical pickup 1 is adjusted through an interactive until its position approaches and equals the position of the target track, as movement of the reading out position is repeated until the target position is reached, and thus each subsequent move of optical pickup 1 is smaller and smaller, the sector numbers will become equal to each other and, the formula is accurate.

Then, in step S42, system controller 6 determines whether or not the address $S_t$ of the target sector to be read out next is larger than the address $S_c$ of the current sector. If system controller 6 determines that the address $S_t$ is larger than the address $S_c$, then in step S43 system controller 6 sets the direction in which optical pickup 1 is to be moved to the forward direction. On the other hand, if system controller 6 determines in step S42 that the address $S_t$ of the target sector to be read out next is equal to or smaller than the address $S_c$ of the current sector, then it sets the direction in which optical pickup 1 is to be moved to the reverse direction in step S44.

Then, in step S45, system controller 6 determines whether or not the remainder of $|S_t - S_c|/S_n$ in expression (10) is 0. If the remainder is not 0, then when optical pickup 1 is moved $T_j$ tracks, it will have moved one track too few. This is because only whole tracks are counted. By way of example, if $S_n = 5$ and $S_t = 18$, then $S_t$ will be in the fourth track. However, expression 10 will determine $T_j$ to be 3 ($T_j = |18 - 0|/5 = 3$) with a remainder of 3. Thus, in order to reach the track on which the target sector $S_t$ is positioned, system controller 6 increments the movement track number $T_j$ by one in step S46. On the other hand, if it is determined that the remainder of $|S_t - S_c|/S_n|$ is 0, $T_j$ will move optical pickup 1 to the proper track, and step S46 is skipped.

Figure 2:
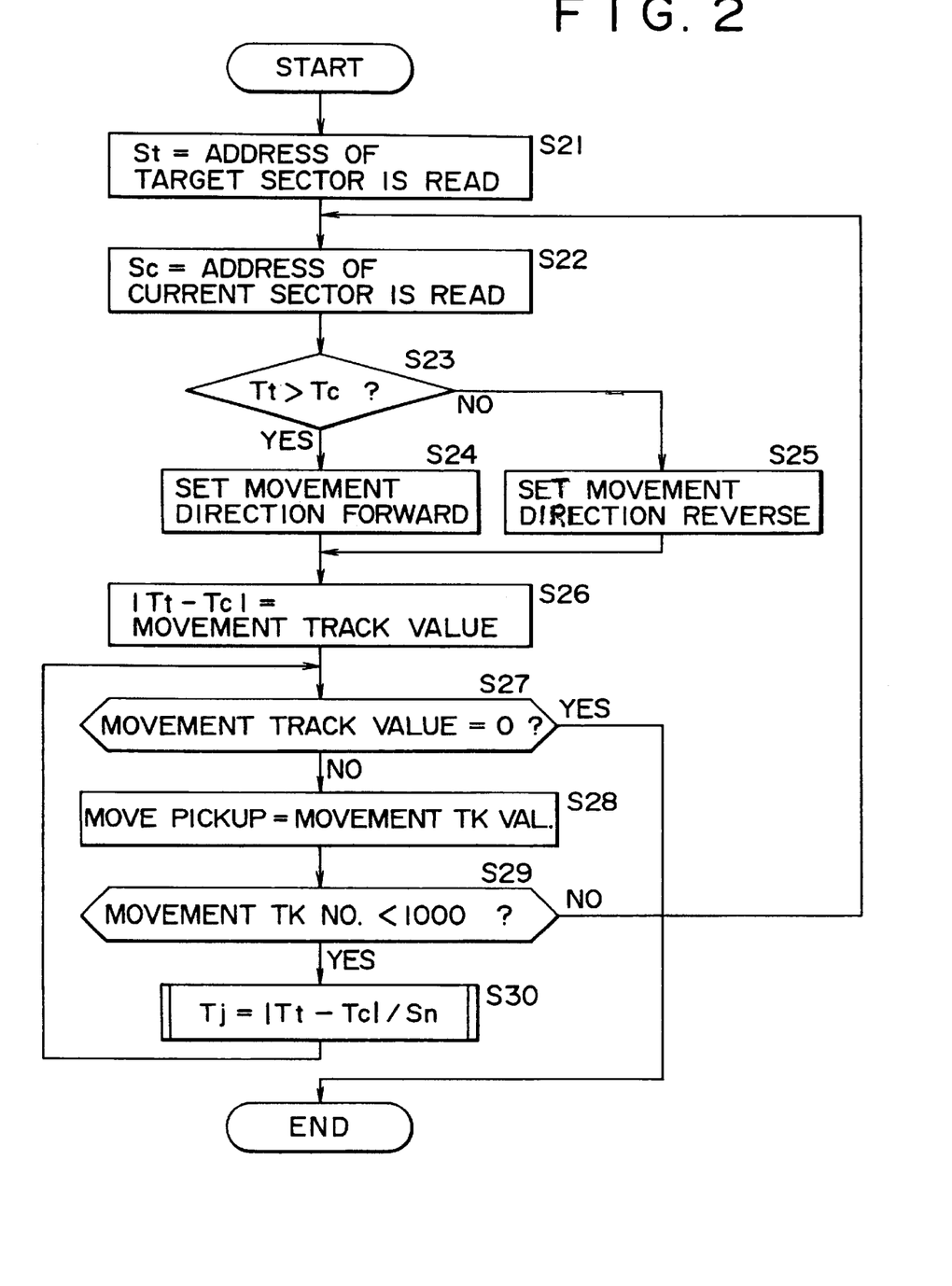
FIG. 2 is a flow chart illustrating the operation of the reproduction apparatus of FIG. 1 when the position of an optical pickup is to be moved.
Figure 3:
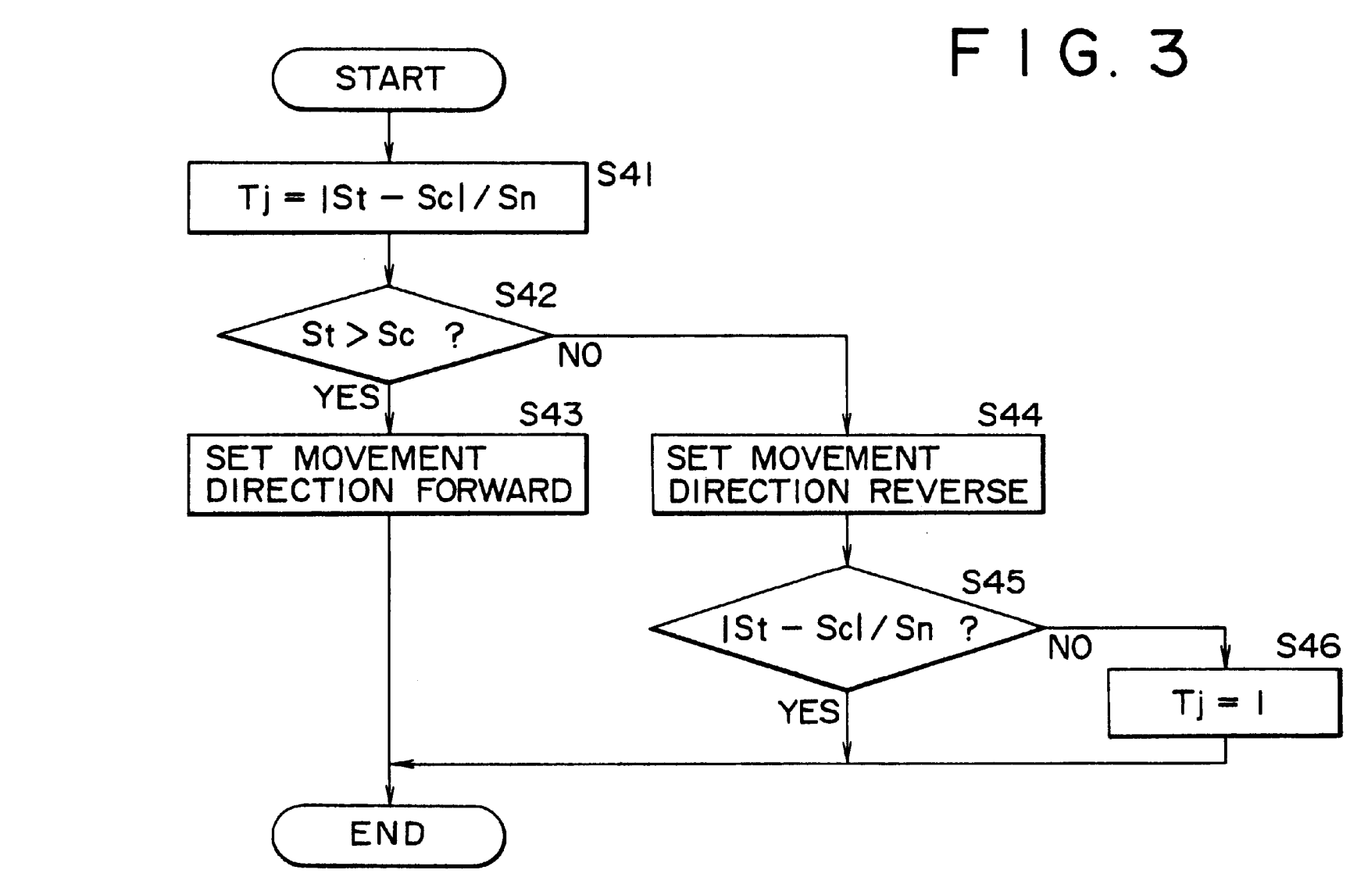
FIG. 3 is a flow chart illustrating the calculation of the required number of tracks an optical pickup must be moved.

In this manner, in step S30 of FIG. 2, calculation of the movement track number is performed in accordance with expression (10). It is to be noted that, by utilizing expression (10) in this manner, the error in determining the movement track number in the proximity of the target track $T_t$ is reduced, and the number of times optical pickup 1 must move until the target track is reached can be reduced.

It should also be noted that, when the movement track number is calculated in step 41 in an alternative embodiment, in place of dividing the absolute value $|S_t - S_c|$ by $S_n$, $S_n$ may be successively subtracted from the absolute value $|S_t - S_c|$ until the result of the subtraction is reduced to 0. The number of such subtraction iterations may be used as the movement track number. Thus, the division procedure is performed by iterative subtraction. By this operation, the load to system controller 6 may be reduced.

Further, in a DVD, since the number of tracks corresponding to a range in which the number of sectors per track is equal is approximately 1,000, 1,000 is used as the threshold value for the movement track number in step S29. However, where optical disc 101 is some other disc, the threshold value may be set to a different dropper threshold value based on the particular type of disc. Additionally, as noted above, a number less than 1,000 may be used for the threshold value, such as 64 in a preferred embodiment.

Figure 4:
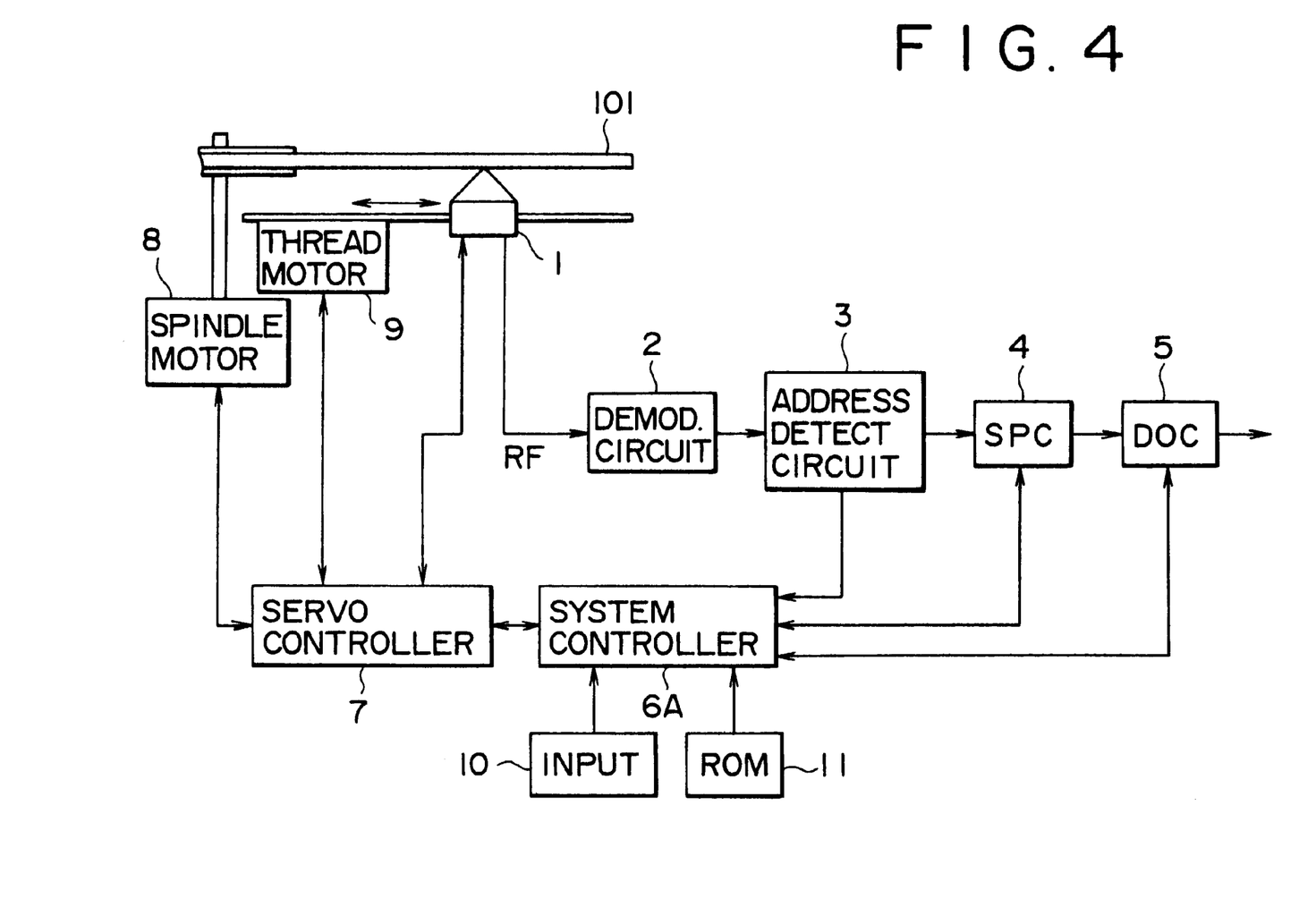
FIG. 4 is a block diagram depicting a reproduction apparatus constructed in accordance with a second embodiment of the invention.

Reference is next made to FIG. 4, which depicts a reproduction apparatus constructed in accordance with a second embodiment of the present invention. Elements similar to those in the first embodiment are designated by like reference numbers and the description thereof is therefore omitted.

A ROM 11 (storage means) stores in advance a table indicating the relationship between the number of sectors per track and track number for each range of tracks on optical disc. 101.

A system controller 6A (control means) controls various circuits similarly to system controller 6 of the first embodiment, and further calculates a movement track number in such a manner as hereinafter described making use of the corresponding relationship stored in the ROM 11.

Figure 5:
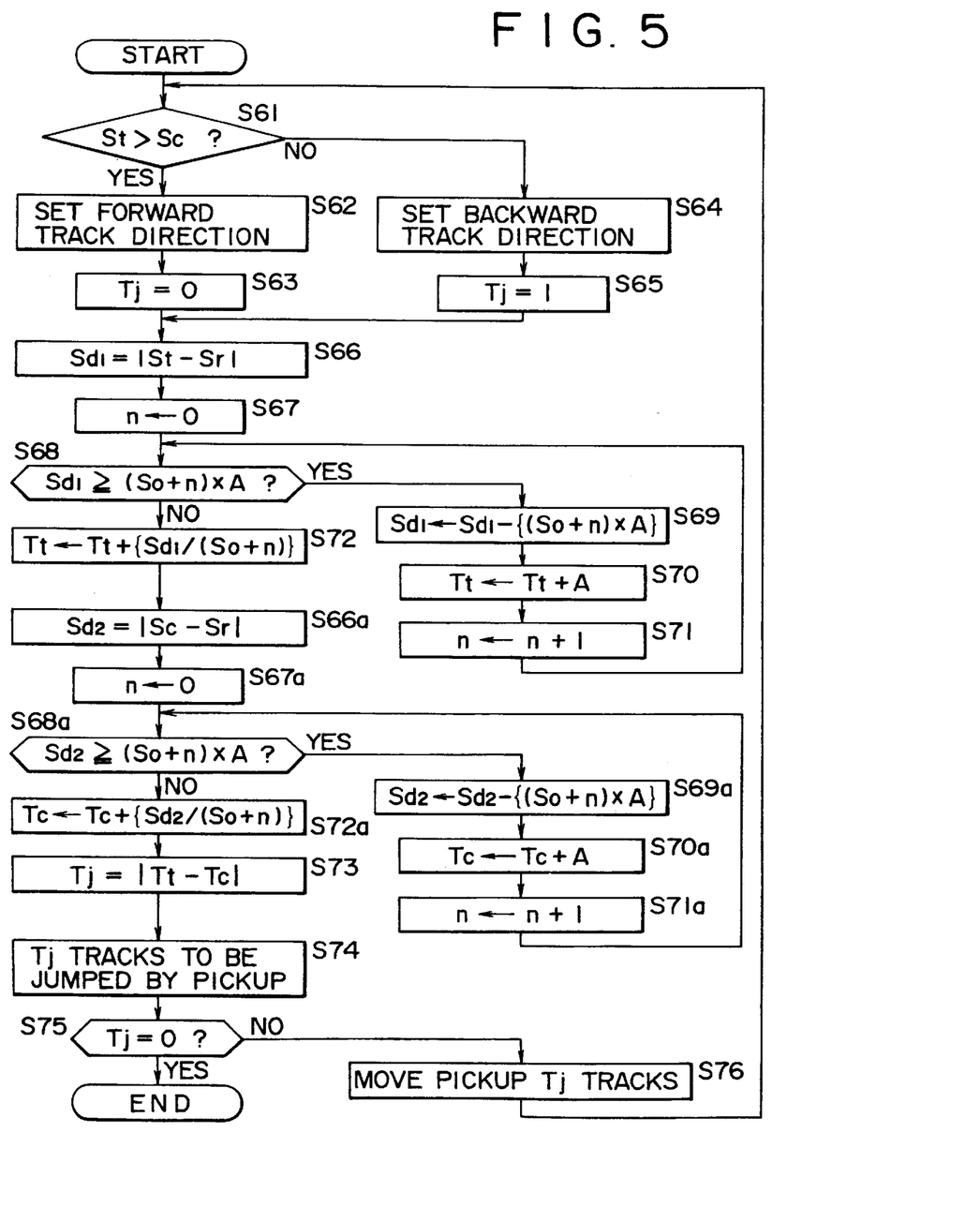
FIG. 5 is a flow chart illustrating the operation of the reproduction apparatus of FIG. 4 when the position of an optical pickup is to be moved.

Reference is now had to FIG. 5, which illustrates the functioning of the apparatus as shown in FIG. 4.

First, in step S61, system controller 6A determines whether or not the address $S_t$ of a target sector to be read out next is larger than the address $S_c$ of a current sector. If system controller 6A determines that address $S_t$ is larger than address $S_c$, then in step S62 system controller 6A sets the direction in which optical pickup 1 is to be moved to the forward direction and in step S63 sets, the value of variable $T_j$ to be used for calculation of the movement track number to 0.

On the other hand, if system controller 6A determines in step S61 that address $S_t$ of the target sector to be read out next is equal to or smaller than address $S_c$ of current sector, then in step S64 system controller 6A sets the direction in which optical pickup 1 is to be moved to the reverse direction and in step S65 sets the value of variable $T_j$ to 1.

Then control is returned to step S66 in which system controller 6A determines the distance, or number of sectors Sd1 from a reference sector $S_r$ to the target sector $S_t$ is calculated in accordance with the formula $S_{d1}=|S_t-Sr|$. Reference sector Sr is typically located along the inside track of an optical disc, or at the first sector of the disc. Then, in step S67, a counting variable "n" is set to zero.

In step S68, letter A designates a number of tracks on an optical disc which all have the same number of sectors, and Sx equals the total number of sectors in one track in the "A" group of tracks. In a preferred embodiment a group of "AA" tracks=1000. It is thus determined whether the number of sectors which are between the target sector ($S_t$) and the reference sector ($S_r$)=$S_{d1}$ is greater or equal to the number of tracks multiplied by the number of tracks in the first group "AA" of tracks. Thus, the formula $S_{d1} \geq (S_{0+n}) \times A$ is used. If $S_{d1}$ is greater than the number of sectors in the group of tracks A, then in step S69, this number of sectors in the group of tracks A is subtracted from the total number of tracks ($S_{d1}$) between the reference sector ($S_r$) and the target sector ($S_t$), and is saved in variable $S_{d1}$. Then, in step S70, a target track number $T_t$ is incremented by the number of tracks A, and in step S71, counting variable n is incremented by 1. Control then returns to step S68.

This time through step S68, the number of sectors $S_{d1}$ (after being decremented) is compared to the total number of sectors in the next group of tracks A all having the same number of sectors. (But possibly having a different number of sectors per track than the first group "A".) Since each track in second group A has $S_1$ sectors, it is checked whether $$S_{d1} \geq (S_1) \times A.$$

If so, then control passes to step S69 and the procedure continues as noted above.

If at any time at step S68 it is determined that $S_{d1}<(S_{0+n}) \times A$, the control passes to step S72, since it has been determined that the target track number $T_t$ is within 1000 tracks of the current value of $T_r$. Thus, $T_t$ is set equal to the prior value of $T_t$ (after being incremented for each group of tracks "A", plus the total number of sectors left to travel $S_{d1}$ (after being decremented for the number of sectors in each group of tracks "A") divided by the number of sectors per track $S_{0+n}$ for the current group of tracks "A" in accordance with the formula:

$$T_t=T_t+(S_{d1}/(S_{0+n}))$$

Thus the number of tracks left to travel within the group of tracks "A" is added to the number of tracks already determined necessary to travel, thus giving the total number of tracks between the reference sector Sr and the target sector $S_t$.

Then in steps S66a to S72a, using the same procedure noted above with respect to steps S66 to S72, the number of tracks $T_c$ from the reference sector $S_r$ to the current sector $S_c$, at which data is currently being read from, is calculated. In step S74 the number of tracks to be moved or jumped, $T_j$ is calculated as the absolute value of the difference between the number of tracks from the track containing the reference sector to the target track $T_t$ containing the target sector $S_t$ and the number of tracks from the track containing the reference sector to the current track $T_t$ containing the current sector $S_c$ in accordance with the following formula:

$$T_j=|T_t-T_c|$$

This determines the number of tracks $T_j$ the optical pickup must move to get from the track containing the current sector to the track containing the target sector. This number is forwarded to a storage memory for moving the optical pickup in step S74. In step S75, it is determined by system controller 6A whether or not the value of variable $T_j$ (the movement track number), is 0. If it is determined that movement track number $T_j$ is 0, then it ends the movement of optical pickup 1.

On the other hand, if system controller 6A determines that movement track number $T_j$ is not 0, then in step S76 system controller 6A causes servo controller 7 to drive motor 9 to move optical pickup 1 by a distance corresponding to the movement track number $T_j$. System controller 6A then returns control to step S61. Processing in steps S61 to S75 is repeated until the movement track number $T_j$ is reduced to 0.

As described above, since the ROM 11 stores the number of sectors $S_n$ per track for a particular group "A" of tracks in advance, there is no need to calculate $S_n$, and the processing is simplified. Thus, the movement of optical pickup to the target track $T_t$ can be performed in a shorter time.

It is to be noted that, for example, when optical disc 101 is a DVD, the movement of optical pickup 1 can be performed by the procedure described above for either a single layer DVD or a dual layer DVD in which addresses in both of the two layers are allocated from the inner circumference side to the outer circumference side of the disc.

On other hand, for dual layer DVD in which addresses in one of the two layers are allocated from the outer circumference side to the inner circumference side of the disc, the movement of optical pickup 1 can be performed simply if the procedure described above is modified so that the directions of track jumping are reversed. In particular, in step S24 of FIG. 2, step S43 of FIG. 3 and step S62 of FIG. 5, the direction of track jumping is set to the reverse direction, but in step S25 of FIG. 2, step S44 of FIG. 3 and step S64 of FIG. 5, the direction of track jumping is set to the forward direction.

Thus, as described above, with the reproduction apparatus and method of the first embodiment, when the position of the optical pickup is to be changed to a sector which is to be read out next, since the number of tracks over which the optical pickup is to be moved is calculated making use of one of a plurality of calculation expressions, the choice of which depends upon the distance to the sector to be read out next, the movement of the optical pickup to the target track can be performed at a high speed.

With the reproduction apparatus and method of the second embodiment, when the position of the optical pickup is to be changed to a sector which is to be read out next, when the number of tracks corresponding to the distance to the next sector is smaller than the number of tracks corresponding to a range of tracks in which the number of sectors per track of the recording medium is equal, the number $T_j$ of tracks over which the position of the optical pickup is to be moved is calculated in accordance with a calculation expression ($T_j=|S_t-S_c|/S_n$) where the address of the target sector to be read out next is represented by $S_t$, the sector address of the current position of the optical pickup is represented by $S_c$, and the number of sectors per track is represented by $S_n$. Thus, the movement of the position of the optical pickup to the target track can be performed at a high speed.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. A reproducing apparatus, comprising:

reading means for reading out data from a recording medium;

control means for controlling the position of said reading means;

determination means for determining a number of tracks for said control means to move said reading means; and comparing means for comparing whether said number of tracks is less than a predetermined number of tracks in which each of said tracks has an essentially equal number of sectors therein, wherein when said number of tracks is less than said predetermined number of tracks, said control means moves the position of said reading means in accordance with the equation $$T_j=|S_t-S_c|/S_n$$

wherein $T_j$ is the number of tracks said reading means is to move, $S_t$ is an address of a target sector to be read out next, $S_c$ is the address of a current sector, and $S_n$ is the essentially equal number of sectors in a track.

2. The reproducing apparatus method of claim of claim 1, further comprising storage means for storing a corresponding relationship between each sector address of the recording medium and the number $S_n$ of sectors of the track in which the sector is located.

3. The reproducing apparatus of claim 1, wherein said predetermined number of tracks is equal to a number of tracks in which each track has an essentially equal number of sectors therein.

4. The reproducing apparatus of claim 3, wherein said predetermined number of tracks is 1000.

5. The reproducing apparatus of claim 1, wherein said predetermined number of tracks is a number of tracks which is less than a number of tracks in which each track has an essentially equal number of sectors therein.

6. The reproducing apparatus of claim 5, wherein said predetermined number of tracks is 64.

7. A reproducing method for reading out data from a recording medium, comprising the steps of:

reading out data from said recording medium by a reading means;

determining a number of tracks to move said reading means;

comparing whether said number of tracks is less than a predetermined number of tracks in which each of said tracks has an essentially equal number of sectors therein;

controlling the position of said reading means in accordance with the equation $$T_j=|S_t-S_c|/S_n$$

wherein $T_j$ is the number of tracks said reading means is to move, $S_t$ is an address of a target sector to be read out next, $S_c$ is an address of a current sector, and $S_n$ is the essentially equal number of sectors in a track, when said number of tracks is less than said predetermined number of tracks.

8. The reproduction method of claim 7, further comprising the step of storing a corresponding relationship between each sector address of the recording medium and the number $S_n$ of sectors of the track in which the sector is located.

9. The reproducing method of claim 7, further comprising the step of setting said predetermined number of tracks equal to a number of tracks in which each track has an essentially equal number of sectors therein.

10. The reproducing method of claim 9, further comprising the step of setting said predetermined number of tracks to 1000.

11. The reproducing method of claim 7, further comprising the step of setting said predetermined number of tracks equal to a number of tracks which is less than a number of tracks in which each track has an essentially equal number of sectors therein.

12. The reproducing method of claim 11, wherein said predetermined number of tracks is 64.

* * * * *